United States Patent
Gupta et al.

(10) Patent No.: US 11,544,566 B2
(45) Date of Patent: Jan. 3, 2023

(54) DEEP LEARNING MODEL INSIGHTS USING PROVENANCE DATA

(71) Applicant: INTERNATIONAL BUSINESS MACHINES CORPORATION, Armonk, NY (US)

(72) Inventors: Nitin Gupta, Saharanpur (IN); Himanshu Gupta, New Delhi (IN); Rajmohan Chandrahasan, Perunagar (IN); Sameep Mehta, Bangalore (IN); Pranay Kumar Lohia, Bhagalpur (IN)

(73) Assignee: International Business Machines Corporation, Armonk, NY (US)

(*) Notice: Subject to any disclaimer, the term of this patent is extended or adjusted under 35 U.S.C. 154(b) by 883 days.

(21) Appl. No.: 16/429,250

(22) Filed: Jun. 3, 2019

(65) Prior Publication Data
US 2020/0380367 A1    Dec. 3, 2020

(51) Int. Cl.
*G06N 3/08*    (2006.01)
*G06K 9/62*    (2022.01)
*G06N 3/04*    (2006.01)

(52) U.S. Cl.
CPC ........... *G06N 3/082* (2013.01); *G06K 9/6257* (2013.01); *G06K 9/6259* (2013.01); *G06N 3/04* (2013.01)

(58) Field of Classification Search
CPC ........ G06N 3/082; G06N 3/04; G06K 9/6257; G06K 9/6259
See application file for complete search history.

(56) References Cited

U.S. PATENT DOCUMENTS

| | | | |
|---|---|---|---|
| 2016/0300156 A1 | 10/2016 | Bowers | |
| 2020/0057675 A1* | 2/2020 | Dias | G06F 9/5083 |
| 2020/0184337 A1* | 6/2020 | Baker | G06N 3/084 |

FOREIGN PATENT DOCUMENTS

| | | |
|---|---|---|
| CN | 107909145 A | 4/2018 |
| CN | 112036563 A | 12/2020 |
| WO | 2016153790 A1 | 9/2016 |
| WO | 20161537901 A1 | 9/2016 |

OTHER PUBLICATIONS

GITHUB, "Train weights to outcome nodes independently #5159", https://github.com/keras-team/keras/issues/5159, Accessed on May 28, 2019, 4 pages.
GITHUB, https://github.com/raghakot/keras-vis, "Neural network visualization toolkit for keras", Accessed on Jan. 29, 2019, 7 pages.
(Continued)

*Primary Examiner* — David F Dunphy
(74) *Attorney, Agent, or Firm* — Daniel J. Hakimi

(57) ABSTRACT

A method, computer system, and a computer program product for generating deep learning model insights using provenance data is provided. Embodiments of the present invention may include collecting provenance data. Embodiments of the present invention may include generating model insights based on the collected provenance data. Embodiments of the present invention may include generating a training model based on the generated model insights. Embodiments of the present invention may include reducing the training model size. Embodiments of the present invention may include creating a final trained model.

17 Claims, 7 Drawing Sheets

(56) References Cited

OTHER PUBLICATIONS

Han et al., "Deep Compression: Compressing Deep Neural Networks With Pruning, Trained Quantization and Huffman Coding", Published as a conference paper at ICLR 2016, arXiv:1510.00149v5 [cs.CV] Feb. 15, 2016, pp. 1-14.
https://keras.io/callbacks/#history, "Usage of callbacks", Callbacks—Keras Documentation, Accessed on May 28, 2019, 7 pages.
Tan et al., "Improving the Interpretability of Deep Neural Networks With Stimulated Learning", © 2015 IEEE, ASRU 2015, pp. 617-623.
Li et al., "Pruning Filters for Efficient Convnets", Published as a conference paper at ICLR 2017, arXiv:1608.08710v3 [cs.CV] Mar. 10, 2017, Abstract, pp. 1-13.
Mell et al., "The NIST Definition of Cloud Computing", Recommendations of the National Institute of Standards and Technology, Special Publication 800-145, Sep. 2011, 7 pages.
Miao et al., "Towards Unified Data and Lifecycle Management for Deep Learning", 2017 IEEE 33rd International Conference on Data Engineering, © 2017 IEEE, pp. 571-582.
Pending U.S. Appl. No. 16/404,141, filed May 6, 2019, entitled: "Deep-Learning Model Catalog Creation", 36 pages.
Pending U.S. Appl. No. 16/167,727, filed Oct. 23, 2018, entitled: Dynamic Batch Sizing for Inferencing of Deep Neural Networks in Resource-Constrained Environments, 35 pages.
Shaikh, "10 Advanced Deep Learning Architectures Data Scientists Should Know!", Accessed on Jan. 31, 2019, 24 pages.
Schelter et al., "Automatically TrackingMetadata and Provenance of Machine Learning Experiments", Machine Learning Systems Workshop at NIPS2017, Long Beach, CA, USA, 8 pages.

\* cited by examiner

DEEP LEARNING MODEL INSIGHTS USING PROVENANCE DATA

BACKGROUND

The present invention relates generally to the field of computing, and more particularly to machine learning. Deep learning models are used in many domains and can be viewed as a black box with regards to understanding model behavior. Various training models may process data and provide different results with varying accuracy. Producing intelligible results and accurate classifications advance the field of machine learning by providing refined and unbiased output data to be used in various domains and industries.

SUMMARY

Embodiments of the present invention disclose a method, computer system, and a computer program product for generating deep learning model insights using provenance data. Embodiments of the present invention may include collecting provenance data. Embodiments of the present invention may include generating model insights based on the collected provenance data. Embodiments of the present invention may include generating a training model based on the generated model insights. Embodiments of the present invention may include reducing the training model size. Embodiments of the present invention may include creating a final trained model.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
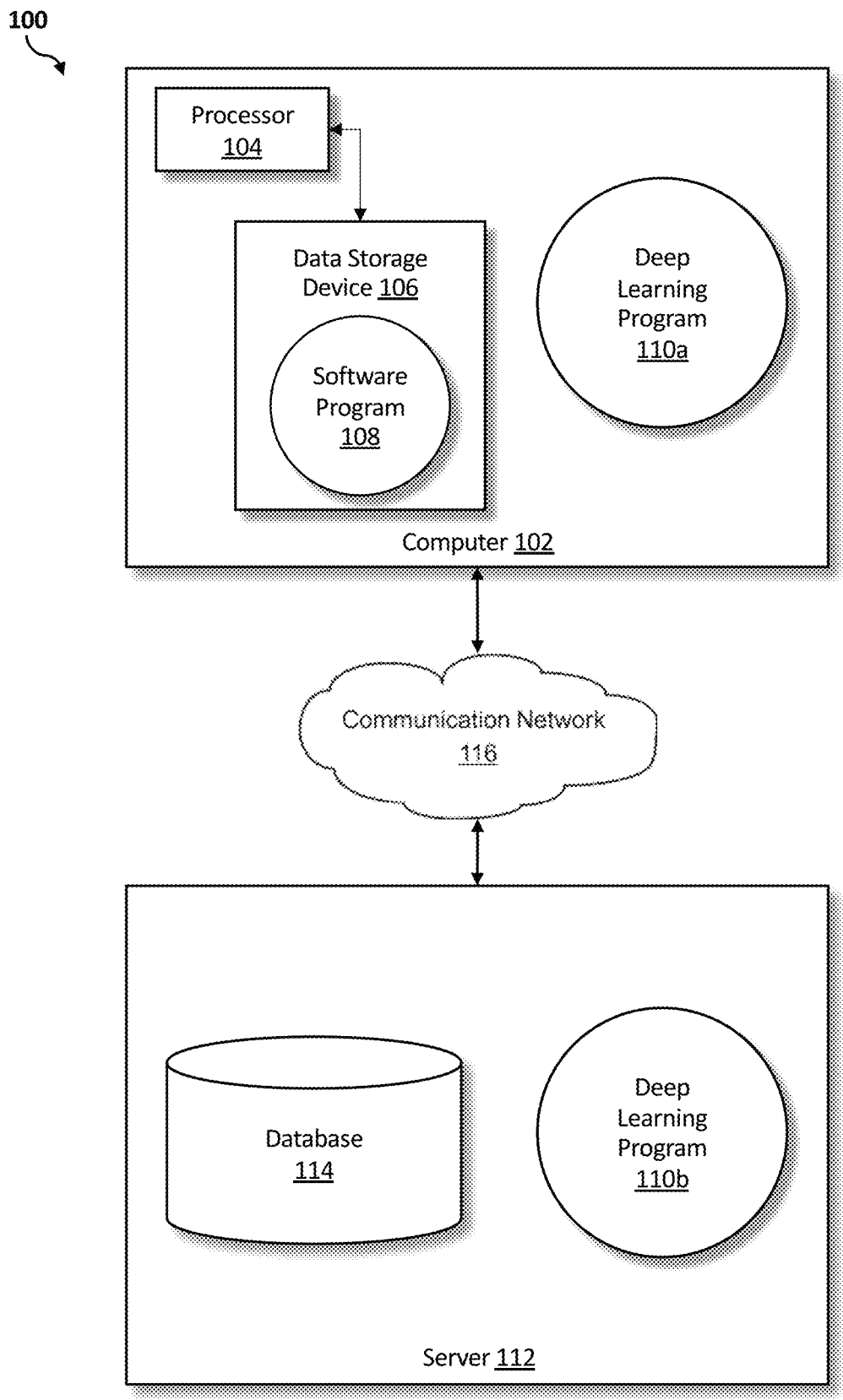
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, deep learning models are used in many domains and can be viewed as a black box with regards to understanding model behavior. Various training models may process data and provide different results with varying accuracy. Producing intelligible results and accurate classifications advance the field of machine learning by providing refined and unbiased output data to be used in various domains and industries.

Deep learning models may collect and analyze large amounts of data that span various domains and may be used to solve real-world issues. However, understanding model training, model analytics, model behavior, model strengths and model reasoning may be limited by the quality of data used in the deep learning training model. Typically, training models are analyzed based on data output from a final trained model, as opposed to provenance data. Existing methodologies of pruning a deep neural network may analyze a final trained network, for example, by calculating the sum of absolute kernel weights of filters and if the sum is less than a threshold, the filter is removed, and the entire network is retrained. One drawback of the existing methodology may include, in consideration of an analysis of a final trained model, that no insights are made about filter weights and how the filter weights converge. Another drawback may include additional overhead being used to retrain the model after the model is pruned. One other drawback may include that pruning filters with low weights does not guarantee that the irrelevant filters have been removed, thus, potentially removing a relevant or important filter.

Additionally, further limitations on the training process may be incurred by the large amount of data being analyzed and the amount of resources being used to train a machine learning model. Therefore, it may be advantageous to, among other things, generate insights to machine learning models using provenance data. More specifically, to generate insights that will increase the accuracy of deep learning models to produce unbiased results and to generate insights as to why the deep learning model is producing inaccurate results. Additionally, the model size may be reduced by determining which nodes to prune at each iteration or after multiple iterations, therefore, providing a larger bandwidth of resources to use for the analysis and the training of the deep learning model.

Deep learning is a type of machine learning that may classify information based on the training data. The training data may be structured data or unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. Deep learning may also be related to or known as hierarchical learning or deep structured learning.

Deep learning may map an input, classify data, interpret datasets and provide an output of data for one or more layers of data. Each layer of data may be represented as a node. A node may also be known as a neuron or an artificial neuron. Deep learning may detect similarities in data that may or may not be labeled. For example, deep learning may operate as supervised learning, unsupervised learning or semi-supervised learning. Supervised learning may use a labeled dataset to train a ML model. Unsupervised learning may use all unlabeled data to train a ML model. Semi-supervised learning may use both labeled datasets and unlabeled datasets to train a ML model. The deep learning models may provide, for example, a graph output that may be generated as nodes and edges relating to the domain specific taxonomy that is being learned.

The following described exemplary embodiments provide a system, method and program product for deep learning. As such, embodiments of the present invention have the capacity to improve the technical field of deep learning by generating insight from deep learning models that utilize provenance data collected during the training phase. More specifically, collecting and analyzing deep learning training data using provenance data at each iteration will be used to build an analytics model, to reduce the model size and to build a reasoning model.

According to an embodiment the analytics model may use provenance data collected during the training phase to generate insights related to model strength, to reduce the model size and to detect reasons for test sample failures. The generated insights from the analytics model may be exploited to reduce the size of the deep learning model. The generated insights from the analytics model may also be exploited to build a reasoning model. The reasoning model may analyze or generate insights regarding the model behavior, the test input sample failures and the model reasoning failures.

A neural network may be a component of deep learning. A neural network may be related to or known as a deep network or a deep neural network. A neural network may interpret, label and classify raw data, such as unstructured data. A neuron in a deep neural network may combine input data and assign a weight to the input data based on a significance level of what the neural network is learning in order to classify the data. The deeper the neural network, the more neurons or node layers the input data passes through. A neuron, a node and a filter may be considered interchangeable terms. The neuron may represent the location that receives input data, produces and associates an input weight to the data and then determines, via a computation, if the data should continue or progress further in the network before the data is classified. Each layer of neurons may train the data based on the previous output layer.

According to an embodiment, provenance data may be collected, stored and analyzed to train a deep learning model. The provenance data is collected and analyzed during the training phase of the deep learning model to provide reasoning and insight for various modeling tasks. Insight for the learning model is generated from the provenance data at each iteration during the training process. The training process may consist of one or more iterations. Provenance data may include data collected based on training data being passed through deep model layers. Each layer that the training data passes through may provide provenance data at each iteration. For example, an image used as training data is passed through a model and the learned weights, activation values and gradients that are produced by the model at each layer and at each iteration. The learned weights, the learned activation values and the learned gradients of the training data at each iteration may be stored as provenance data. An analysis of provenance data at each iteration may consist of filtering and assigning weights at a neuron connection, using training images, using activation values and using calculated gradients. Collecting and storing the provenance data at each iteration generates insights at one iteration and over time, may collectively create a highly accurate training model after multiple iterations.

In an embodiment, the collected provenance data may be used to build an analytics model to generate insights about the deep learning model during model training. The analytics model may evaluate neuron weights convergence, how many neuron weights have converged, how quickly the neuron weights have converged, neuron weight fluctuation, neuron learning features, a learning history of each neuron, which sets of neurons are correlated, a neuron weight lineage and nodes that have not been used. The analytics model evaluations provide insights on how to optimize a deep learning network.

Provenance data may be analyzed across different iterations. The quality of the provenance data may be determined by analyzing neuron weights convergence and how quickly the neuron weights have converged. A non-convergence of the weights may imply that the training data is good quality or is higher quality data, for example, the class data is balanced or there is minimal or no blur or noise in the image data. Correspondingly, the more that the weights converge, less provenance data may be needed for further training. A fast convergence of neuron weights indicate that the provenance data is quality data. Alternatively, a slower convergence of neuron weights indicates a lower quality of training data such as a lower number of samples, an imbalanced class or not many variations of data.

Analyzing provenance data for a filter weight convergence and changes at each iteration may provide information that allows for the prioritization of filters and to identify which filters to prune. Properly identifying which filters can be pruned without losing the integrity of the model may assist in reducing the size of the deep learning models. Neuron weight fluctuation may be analyzed to determine if model parameters are properly updated. Model parameters may, for example, include the momentum and the learning rate of the model. If the weights of the neurons are highly fluctuating, even after a large number of iterations, then a weight oscillation issue may be occurring. The weight oscillation may indicate that the data is not sufficient for model training.

Analyzing neuron correlations may determine how features are combined to offer a more complex representation of the provenance data at each iteration. Neuron correlation analysis may also assist in understanding if the neurons are learning with different filters. If a neural network learns similar filters, then an indication may be made that the complexity of the data is low or simple such that a small network is sufficient to learn the data patterns of the training data. A low complexity of data may indicate, for example, that a low amount or no noise is present in the data, less data classes are present, less data variations are present, no occlusion is present, and no background information is present. With a smaller network and simplified data, some redundant filters may be removed or the number of layers or the number of nodes in a network may be reduced.

Analysis of the learning history of each neuron may be done by producing a snapshot or a video clip for each neuron. The snapshot or video clip may illustrate features of the neuron learning over time and may highlight the regions on the image that are getting activated. For example, provenance data is used to create a model snapshot that is taken at each timestamp to immediately show how the activations have evolved during the training. The visualizations obtained from the snapshot of the provenance data taken at each timestamp are accurate depictions as opposed to back-propagated estimations.

The snapshots may produce an image file in multiple formats such as a graphics interface format (gif), a joint photographic experts group (jpeg), a portable network graphics (png) or a tagged image file format (tiff). Collecting provenance data and creating the model snapshot of the neuron history at each iteration may provide insights for training a model. The model snapshot may provide insights by analyzing the data regarding weights, activation and changes across iterations. The insight may assist with the prioritization of which neurons or filters to prune, thereby reserving resources while increasing accuracy.

Neuron weight lineage may include generating a lineage for each neuron weight. For example, at each step, the deep learning program can produce input weights of other neurons that are back-propagated. The applied transformation and the input image may also be produced. The data that is used to update the weight is the data that may be used for producing the input weights, the applied transformation and the input image.

In an embodiment, the generated insights from the analytics model may be used to reduce the size of deep learning models. The deep learning models may be reduced in size at each iteration during training. If it is determined that some of the neurons have learned similar filters, then the redundant filters may be pruned or removed from the network. Additionally, analyzing the weight change over each iteration may allow higher weighted filters to be pruned. For example, given two different neuron weights, if one weight is higher than the other weight, and both the higher weight and the lower weight are decreasing at each iteration, then the higher weighted filter can be removed since the higher weighted filter is reducing relevancy as the number of samples are increasing with each iteration.

An average deep network may include, for example, 8 layers, 96 filters of size 11×11, 100,000 images and 100,000 iterations. At each iteration, the stored data may include the weights of all neurons and connections and for each image, the region that is activated by each neuron. The total number of stored values may become large and keep growing, for example, starting at 10B and getting much larger.

A reduction of the model size may provide less computation which may result in less run time needed to gain further insights about the training model or less runtime needed for the deep learning model. The training may begin with a large number of nodes and the large number of nodes may be representative of the model size. The model size may vary and may be dependent on the amount of training data for a particular domain. Varying model sizes may be executed and independently run to assess model features. For example, varying model sizes and trying different filters requires an independent run of model training that may not be feasible in a real machine learning setting. The knowledge gained from the various model sizes and various filters may be used to reduce the size of the deep learning model at the time of model training when using provenance data.

In an embodiment, a reasoning model may be built to generate insights about deep learning models using provenance data. A reasoning model may also be built to further prune data, to test query samples and to figure out the reason that input test samples may fail on a model. The reasoning model may evaluate or exploit the insights generated from the analytics model to reason about the behavior of deep learning models. The reasoning model may assist in detecting a non-optimal performance or a poor performance of a model by analyzing model parameters. For example, the reasoning model can detect poor performance in a model by analyzing model parameters using provenance data and by using the built analytics model. Model parameters may include data distribution, adversarial samples, corrupted samples, underfitting, overfitting, model training issues or sampling issues.

A reasoning model analysis relating to adversarial samples may include, for example, feeding misclassified samples into a model and assessing the model performance and model behavior. Using provenance data, a graph may be generated to illustrate which class samples are responsible for the activation of nodes at different iterations. More specifically, the graph may be generated to illustrate which portion of a class sample image is responsible for the activation of nodes. The graph may provide insight related to which nodes have learned the class samples or parts of the class samples.

Underfitting may degrade model performance by the inability of the machine learning model to accurately depict the input data or the data trends. Overfitting may degrade model performance by feeding the machine learning model a large amount of training data such that the model learns too many details, such as the noise and inaccurate data. Underfitting or overfitting of a training model may be determined by analyzing node activations at various layers and at various iterations. For example, if a node in a higher layer hierarchy activates for different class samples at initial iterations but does not activate for the different class samples at later iterations, then underfitting or overfitting may be present. Additionally, underfitting or overfitting may also be present if the hierarchy of node activations do not saturate from multiple classes to a single class or if the class set samples that activate the nodes do not carry any visual similarity. If fine grained class samples are used and the node activation got saturated and still maps the test samples to the wrong class, then there is a chance that the test sample may belong to an adversarial category. Fined grained class samples may include class set samples that carry visual similarity. The saturation of node activation may be, for example, a node that was activated for a single class.

The reasoning model may also analyze model training issues relating to sampling issues. The reasoning model may identify a sampling strategy issue by using images that would activate, or images that would be responsible for activating, nodes in order to capture the pattern of node activations. For example, if same class samples activate different sets of nodes, then the information may assist in figuring out if a single class has multiple distributions or if there is an issue with the sampling strategy.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a deep learning program 110a. The networked computer environment 100 may also include a server 112 that is enabled to run a deep learning program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the deep learning program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the deep learning program 110a, 110b (respectively) to build an analytics model that may generate insights by analyzing provenance data collected during deep learning training. The generated insights from the analytics model may be further used to reduce the size of the deep learning model and to understand the reasoning for deep learning model failures. The deep learning method is explained in more detail below with respect to FIGS. 2-4.

Referring now to FIG. 2A, a block diagram example of collecting provenance data at each iteration used by the deep learning program 110a, 110b according to at least one embodiment is depicted.

Training data 202 may include input data, both structured and unstructured data. For example, training data 202 may include images and documents stored on one or more databases. Public databases may be used, and private databases may be used with proper access. For example, training data 202 samples may include various animal species obtained from public databased to train a model. A private database example may include images and documents used from a hospital repository to train a model relating to medical images or medical diagnoses. Another private database example may include images and documents from other industries, such as finance, legal, agriculture, automotive or government. Training data 202 may be obtained based on accessibility.

Deep neural network architecture may have multiple layers 204a-n. Each layer 204a-n may have multiple neurons or nodes. The layers 204a-n may be various types of layers, such as convolutional, pooling, Relu, liner or fully connected. The loss layer 206 may be after the last layer 204n. The loss layer 206 may calculate the model strength and the gradients. The loss layer 206 may back propagate the gradients to the previous layer, such as layer 204n, to update model weights. Each iteration of the model has a forward and a backward pass. After each iteration, the collected data my include provenance data 208a-n. The provenance data 208a-n may include the training images used in that iteration, the learned weights, the activation values and which nodes were activated, and the gradients.

Figure 3:
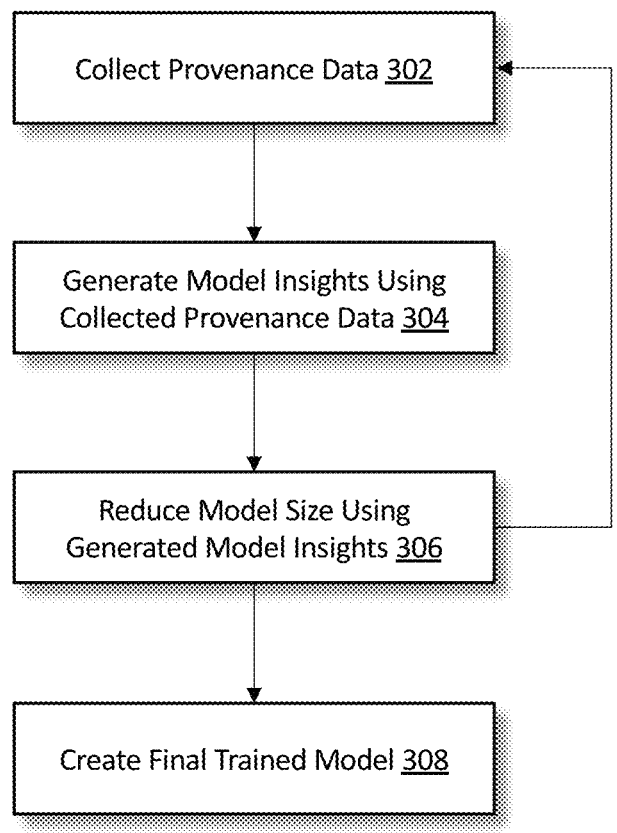
FIG. 3 is an operational flowchart illustrating a process for building an analytics model using the collected provenance data according to at least one embodiment.

Referring now to FIG. 3, an operational flowchart illustrating the exemplary analytics model building process 300 used by the deep learning program 110a, 110b according to at least one embodiment is depicted. The analytics model building process 300 may be created by using the collected provenance data during a model training phase to generate insights related to the model strength.

At 302, provenance data is collected. The provenance data is collected by passing the training data 202 through deep model layers and by storing the provenance data and the training data at each iteration, for example, as previously shown in FIGS. 2A and 2B. For example, training data retrieved from a public database relating to a specified animal species is collected and passed through deep model layers in a deep network and the provenance data is collected on the training data for that iteration. Both the provenance data and the training data are stored on a database at each iteration.

At 304, model insights are generated using the collected provenance data. Model insights will be gained by analyzing neuron weights, neuron learning features, neuron histories and lineages, correlated neurons and unused neurons. The number of neuron weights that have converged may be analyzed, for example, to either find an issue with the collected provenance data or to find more data that may be used to train the model at another iteration. Neuron weights analysis may include evaluating the speed in which the neuron weights converge and the number of iterations that were taken are evaluated to identify the accuracy of the collected data and the accuracy of the trained algorithm. For example, the training data relating to animal species and the collected provenance data is evaluated by the analytics model and the neuron weights have converged quickly after 5 iterations. Therefore, the fast convergence of neuron weights may indicate that the training data of the specified animal species is quality data.

Neuron weights analysis may also include evaluating the weights of the neurons. If the neuron or the filter is widely fluctuating, then a parameter may need to be amended or altered, such as by changing the momentum. The neuron weight analysis may include comparing the weights of the neurons across the iterations and by plotting a graph to visually illustrate the neuron behavior. Neuron learning feature analysis may include identifying if the neuron is learning the same feature. Filters may be added or reduced at each layer, for example, if a neuron is learning the same filters, then those filters at that particular layer may be pruned.

Neuron learning history analysis for each neuron may be evaluated such that a snapshot or a video-clip is produced to highlight which features the neuron is learning over a time period. The snapshot may additionally highlight which neuron regions are getting activated while generating insights for the collected provenance data. The snapshot may also provide a visualization of how the neural network is operating, for example, an image file may be produced for a user to view a representation of the neuron learning history.

Neuron correlation analysis may evaluate which sets of neurons are correlated and may provide an understanding of the deep neural network and how the features may be combined to give a more complex representation of each iteration. The neuron lineage analysis may be generated or produced at each iteration for each neuron weight and the input weights of other back-propagated neurons.

At 306, the model size is reduced using the generated model insights. The model insights generated at step 304 may be used to reduce the model size. At each iteration, the provenance data is analyzed, and the network size may be pruned or reduced. Upon a reduction of the network size, the model training is continued on the reduced network. The model insights that may be used to reduce the network size may include insights gained regarding neuron weights, neuron connections, features learned by various filters and neuron weight convergence or neuron weight non convergence. For each n iterations, a periodic analysis may be completed on the collected provenance data, and if it is determined that neuron removal should occur, then the network model is reduced.

For example, consider two neurons at layer 1, N1(1) and N2(1), and two respective neurons in the final trained model at layer 1+1, N3(1+1) and N4(1+1), having corresponding weights, w1 and w2. Therefore, N1(1) and N3(1+1) have a corresponding weight of w1 and N2(1) and N4(1+1) have a corresponding weight of w2. In the present example, weight w1 is larger than weight w2. The provenance data may provide information that the weight, w1, connection of neuron N1(1) and corresponding N3(1+1) is decreasing with time while the weight, w2, of the neuron connections N2(1) and corresponding N4(1+1) is increasing over time. In this instance and based on the gathered provenance data insights, the deep learning program 110a, 110b may prioritize the weight that may be increasing over time, w2, and corresponding neuron connections N2(1) and N4(1+1) over w1 and corresponding neuron connections N1(1) and N3(1+1). Thus, the deep learning program 110a, 110b may decide to remove or prune the N2(1) and N4(1+1) neural connection. Additionally, over time, the neuron weights may be converging, thus allowing additional reasoning to remove the neurons at the lower weight layer to reduce the model size while retaining the accuracy of the model.

At 308, a final trained model is created. For example, the final trained model may be created after n number of iterations and based on the analyses in the previous steps. The final trained model may be stored in a database for future use. Additionally, the final trained model may still undergo more analyses for a continual generation of insights of the trained model, such as analyses provided in steps 304 and 306.

Figure 4:
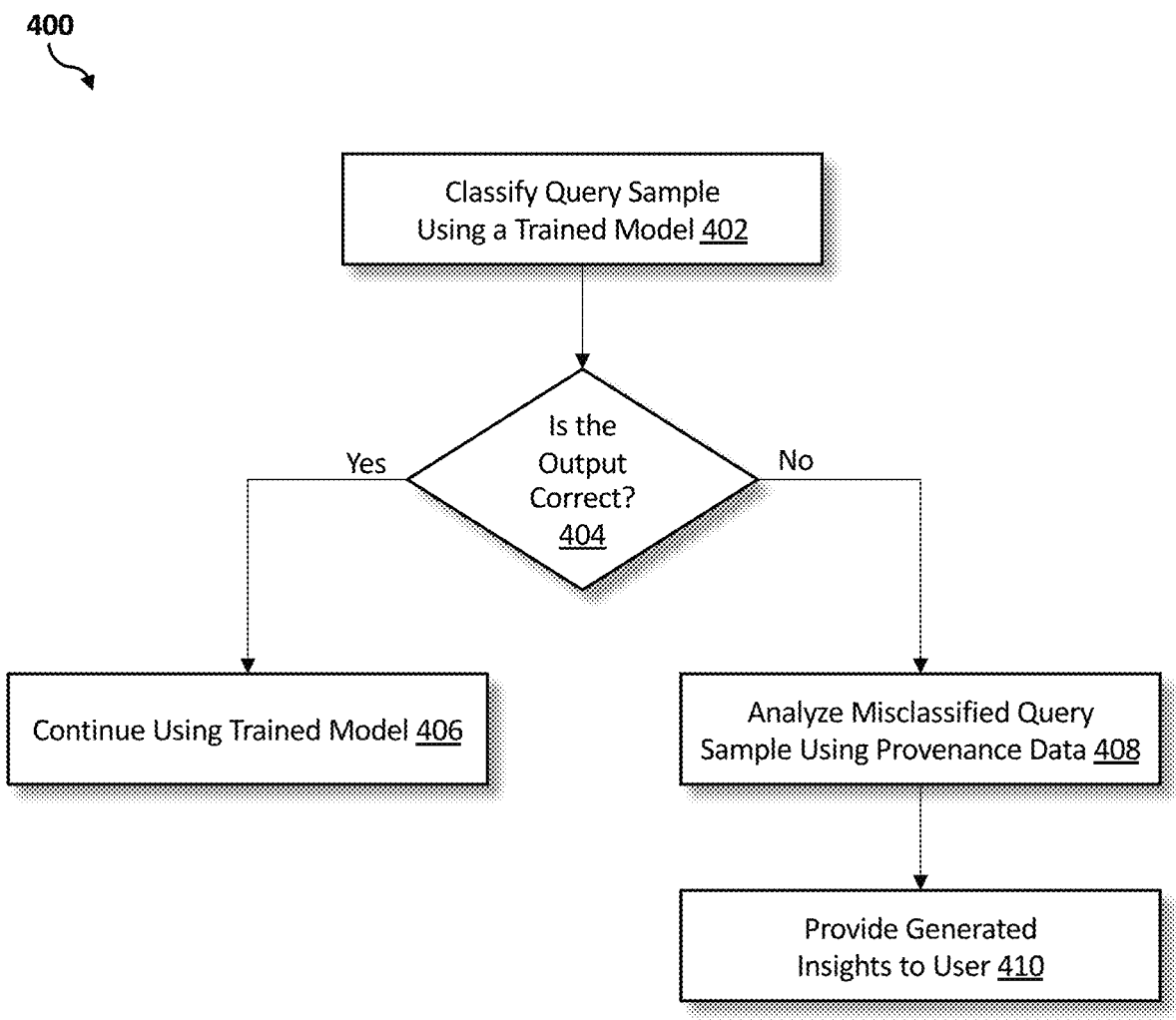
FIG. 4 is an operational flowchart illustrating a process for building a reasoning model using the collected provenance data according to at least one embodiment.

Referring now to FIG. 4, an operational flowchart illustrating the exemplary reasoning model building process 400 used by the deep learning program 110a, 110b according to at least one embodiment is depicted. The reasoning model building process 400 may be created by using the final trained analytics model with query samples. The reasoning model may provide information relating to, for example, why certain input test samples fail on a model and how to exploit the insights created by the analytics model to understand the behavior of deep learning models.

At 402, a query sample is classified using the trained model from step 310. A query sample of data may include data from a specific domain or industry, or the query sample may include a batch of unrelated data. The query sample data may be classified using the trained model. For example, two different batches of class sample images and documents from two different animal species, class A (e.g., cats) and class B (e.g., dogs), are input into the trained model for classification. The class A samples and the class B samples may include one or more data distributions to be classified.

At 404, the deep learning program 110a, 110b determines if the output is correct. The deep learning program 110a, 110b may determine if the output is correct by analyzing the trained model classifications of the input query samples. The determination may include comparing neurons that are activated from the beginning iterations of the query samples to neurons that may be activated during the later iterations of the query samples. For example, if samples from the same class activates X neurons on the first couple of iterations, and then on the next couple of iterations the same class samples activates other X' neurons, then it may indicate that the particular class has multiple distribution samples and an incorrect sampling was used. An incorrect sampling may be due to one distribution of samples that were trained at the first couple of iterations and then samples from a different distribution of the same class were used in later iterations. Later iterations may include query samples that have been unfolded with additional class data samples that may be distributed.

Analysis of the output may provide insights and reasons for correct classifications or for incorrect classifications or misclassifications. For example, applying the reasoning model on the trained model, a user may want to determine if a model classifies a sample correctly or incorrectly and then the user may want a reason for the correct or incorrect output. A user may provide a label for correction purposes, for example, as ground truth to create a higher accuracy for the model. A classification analysis may include a fine grained class, underfitting or overfitting of a model or adversarial sample analysis. Fine grained classes may include a class set sample that have visual similarity or share a similar image structure. Underfitting or overfitting a model may include using class samples that do not share visual similarity.

The provenance data may be used to generate a graph illustrating various iterations of class samples that may be responsible for the neuron activations. The generated graph may illustrate in a single distribution, for example, the specific portion of the class sample image that activated the neuron. Classes may have samples from multiple distributions, for example, using an animal, such as a dog class example in a single class, however, samples from various dog breeds may be in the dog samples. If various dog breeds are within the samples, then multiple distributions may be created within the same class. The generated graph may indicate, visually, the distribution or the multiple distributions. The provenance data may also generate a graph to illustrate later iteration neuron hierarchies of underfitting, overfitting or fine grained classes.

If the deep learning program 110a, 110b determines that the output is correct at 404, then the trained model continues to be used at 406. A correct output may be illustrated by a graph and changes or alterations to the trained model may not be necessary. The trained model may continue to be operated by users.

If the deep learning program 110a, 110b determines that the output is not correct at 404, then the misclassified query sample is analyzed using the provenance data at 408. For example, class A samples got classified as class B samples. Some reasons for the misclassified query samples may include a corrupted or adversarial sample that has a different data distribution, an underfitting issue, an overfitting issue on the training data 202 or a sampling issue.

Continuing from the example in step 402, the class A samples and the class B samples activated nodes n1, n2 to nk at the first few iterations of the first few data distributions. Class A contains samples from multiple species of the class A animal. As the class A samples and the class B samples unfolded through further iterations, a different set of nodes, nodes m1, m2 to mj, began activating for class A. The different set of node activation may indicate a misclassified sample in one of the distributions of class A and also may indicate a biased trained model with one of the distributions. For example, if an assumption is made that the misclassified test sample belongs to distribution 1 of class A, and the trained model used an inaccurate sampling strategy. Therefore, improvements to the trained model may be configured to improve the sampling strategy by, for example, adding more samples or determining if there is a need to divide one class into multiple classes to avoid a class distribution overlapping effect.

At 410, generated insights are provided to the user. The generated insights may be produced to a user operating a computing device. The generated insights may include visual aids, graphs, charts, images, videos or type written messages. The generated insight output may produce a varying range of data analytics to the user based on the analyses at, for example, steps 304 and 408. The output data transmitted to the user may provide the user with insight to make decisions relating to model training, use and accuracy.

Figure 2:
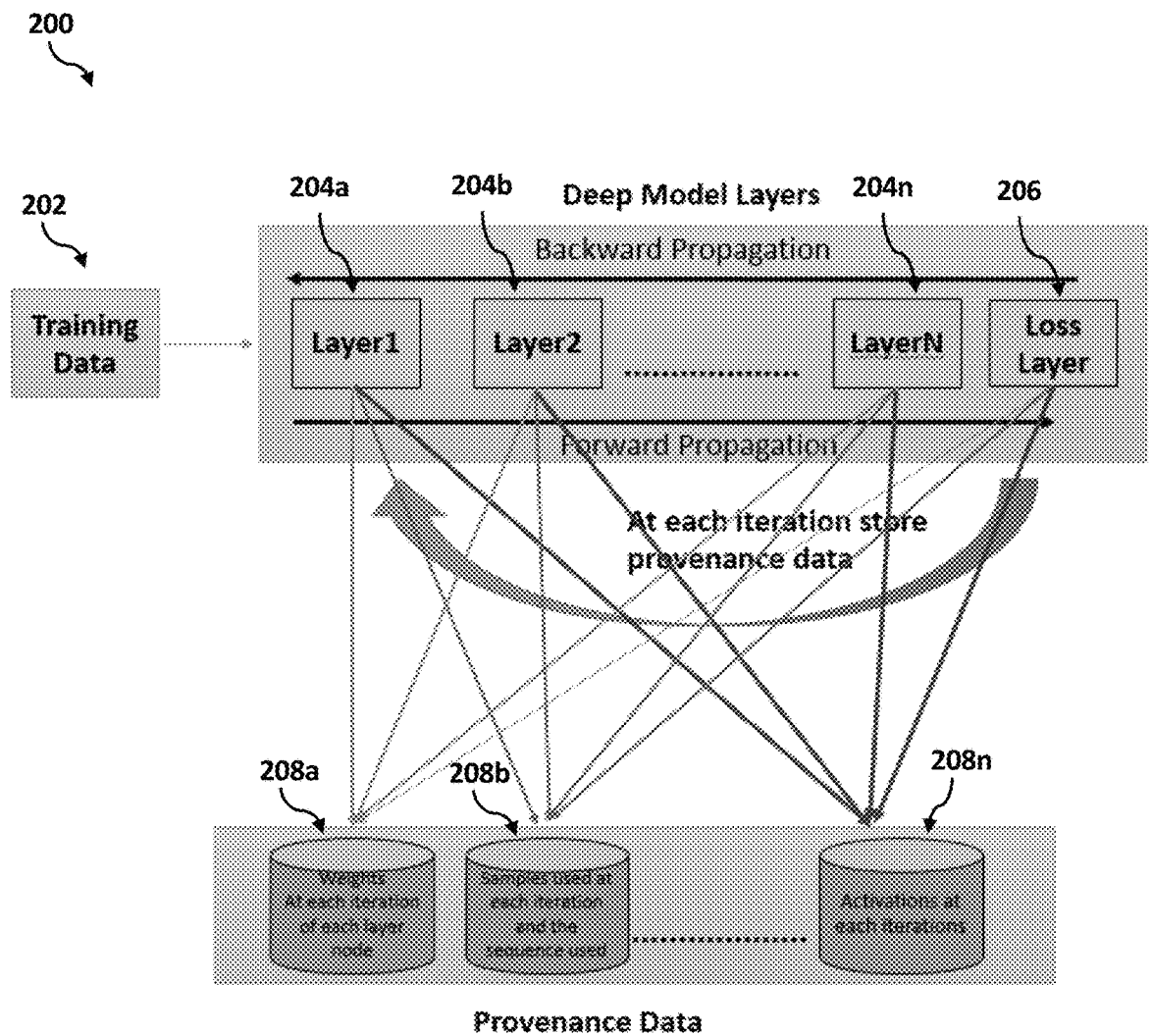
FIG. 2 is a block diagram example of collecting provenance data at each iteration according to at least one embodiment.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
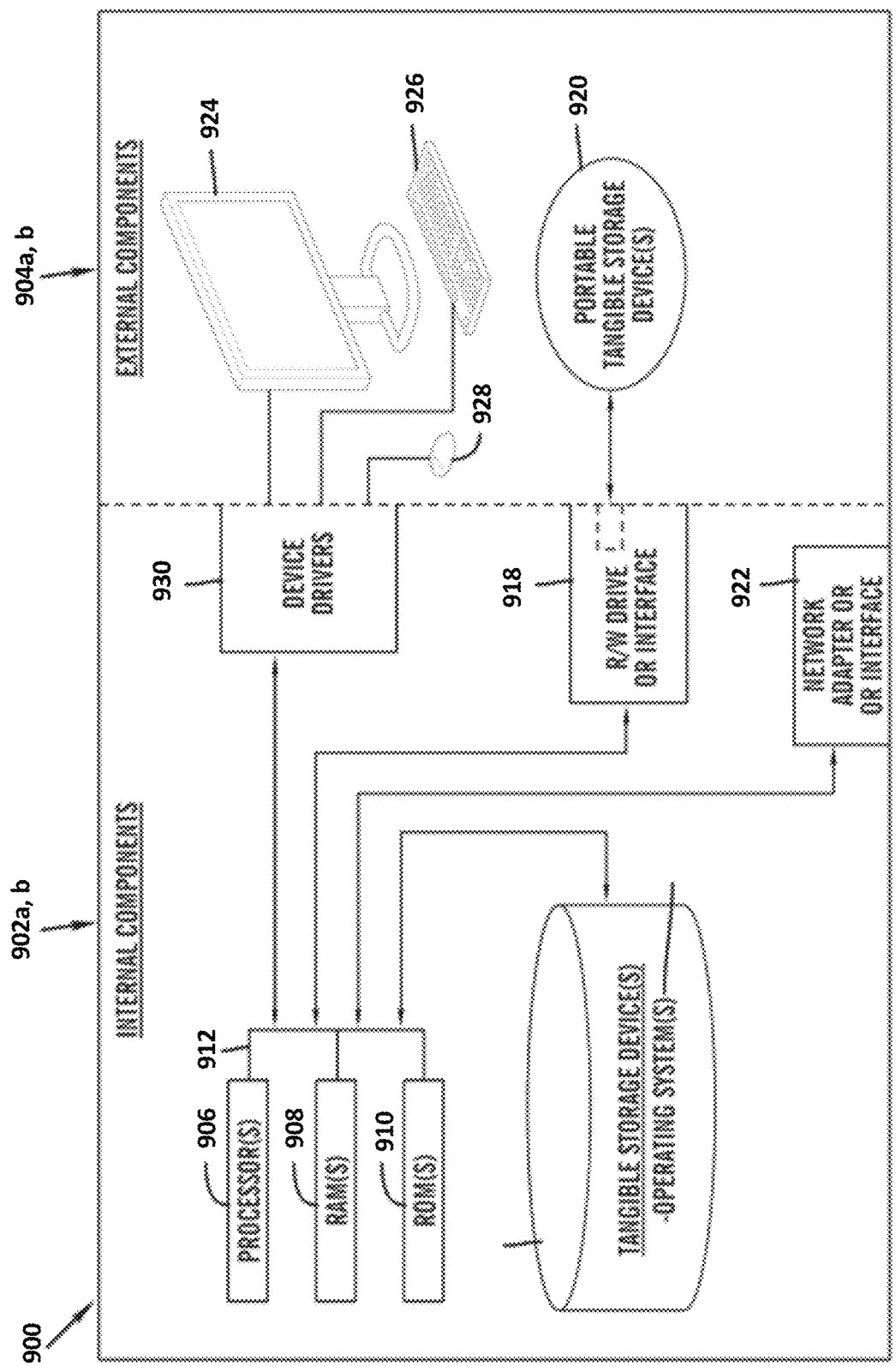
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the deep learning program 110a in client computer 102, and the deep learning program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the deep learning program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the deep learning program 110a in client computer 102 and the deep learning program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the deep learning program 110a in client computer 102 and the deep learning program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
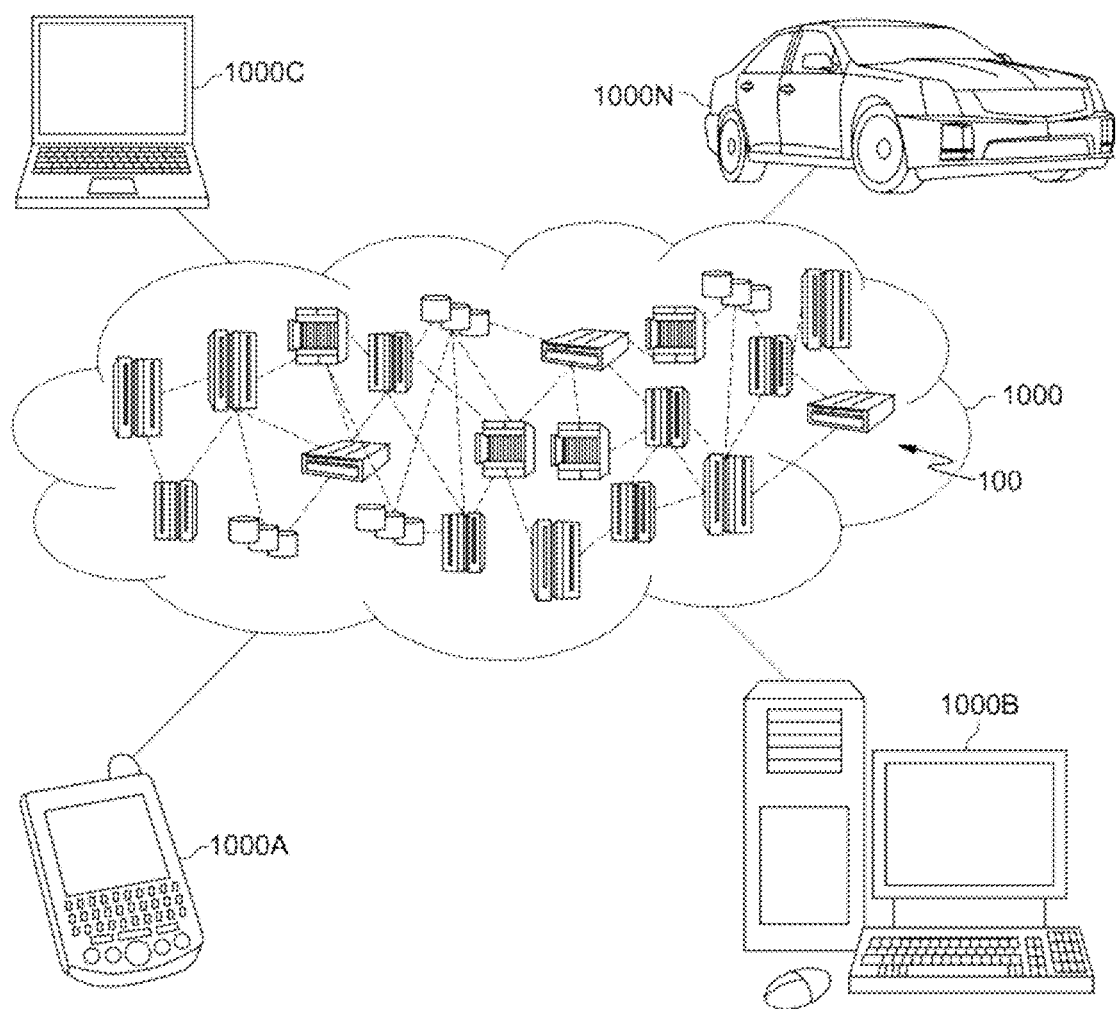
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
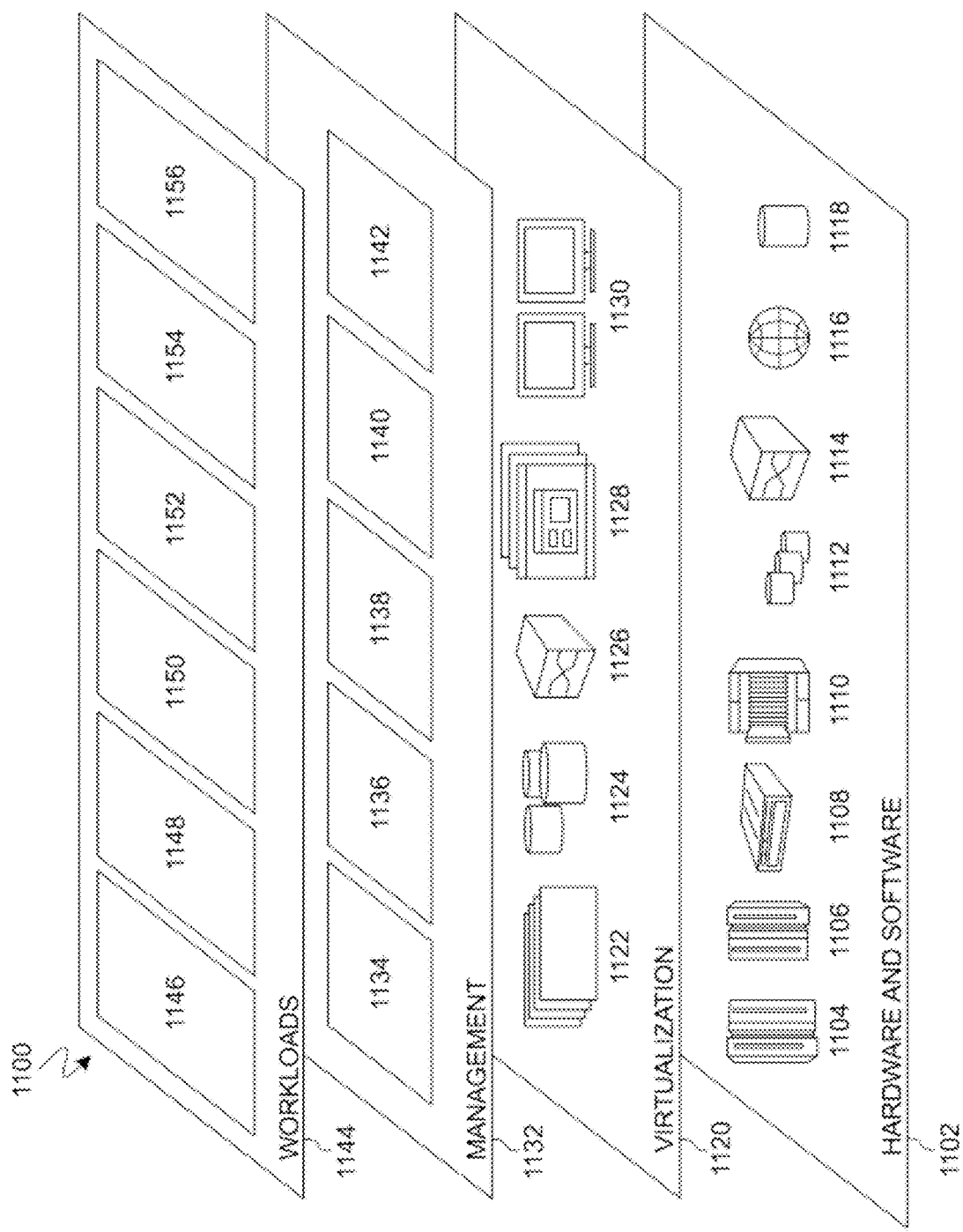
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and deep model learning 1156. A deep learning program 110a, 110b provides a way to use provenance data to gain insights during a deep learning model training phase.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   collecting provenance data;
   generating model insights based on the collected provenance data;
   generating a training model based on the generated model insights;
   reducing the training model size; and
   creating a final trained model;
   classifying a query sample using the final trained model;
   determining a misclassification of the query sample in a final trained model output;
   analyzing the misclassification using the provenance data; and
   providing generated insights based on the misclassification to a user.

2. The method of claim 1, wherein the provenance data includes data collected during a deep learning training phase.

3. The method of claim 1, wherein the provenance data includes learned weights, learned activation values, learned nodes and learned gradients based on a training image being passed through one or more iterations of a deep learning model.

4. The method of claim 1, wherein the provenance data includes learned weights, learned activation values, learned nodes and learned gradients based on a training image being passed through one or more layers of a deep learning model.

5. The method of claim 1, wherein the model insights are generated by analyzing the provenance data, wherein the model insights include an analysis of neuron weights, neuron learning features, neuron histories, neuron lineages, correlated neurons and unused neurons.

6. The method of claim 1, wherein reducing the model size is determined based on a periodic analysis.

7. A computer system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   collecting provenance data;
   generating model insights based on the collected provenance data;
   generating a training model based on the generated model insights;
   reducing the training model size; and
   creating a final trained model;
   classifying a query sample using the final trained model;
   determining a misclassification of the query sample in a final trained model output;
   analyzing the misclassification using the provenance data; and
   providing generated insights based on the misclassification to a user.

8. The computer system of claim 7, wherein the provenance data includes data collected during a deep learning training phase.

9. The computer system of claim 7, wherein the provenance data includes learned weights, learned activation values, learned nodes and learned gradients based on a training image being passed through one or more iterations of a deep learning model.

10. The computer system of claim 7, wherein the provenance data includes learned weights, learned activation values, learned nodes and learned gradients based on a training image being passed through one or more layers of a deep learning model.

11. The computer system of claim 7, wherein the model insights are generated by analyzing the provenance data, wherein the model insights include an analysis of neuron weights, neuron learning features, neuron histories, neuron lineages, correlated neurons and unused neurons.

12. The computer system of claim 7, wherein reducing the model size is determined based on a periodic analysis.

13. A computer program product comprising:
   one or more computer-readable tangible storage media and program instructions stored on at least one of the one or more computer-readable tangible storage media, the program instructions executable by a processor to cause the processor to perform a method comprising:
   collecting provenance data;
   generating model insights based on the collected provenance data;
   generating a training model based on the generated model insights;
   reducing the training model size; and
   creating a final trained model;
   classifying a query sample using the final trained model;
   determining a misclassification of the query sample in a final trained model output;
   analyzing the misclassification using the provenance data; and providing generated insights based on the misclassification to a user.

14. The computer program product of claim 13, wherein the provenance data includes data collected during a deep learning training phase.

15. The computer program product of claim 13, wherein the provenance data includes learned weights, learned activation values, learned nodes and learned gradients based on a training image being passed through one or more iterations of a deep learning model.

16. The computer program product of claim 13, wherein the provenance data includes learned weights, learned activation values, learned nodes and learned gradients based on a training image being passed through one or more layers of a deep learning model.

17. The computer program product of claim 13, wherein the model insights are generated by analyzing the provenance data, wherein the model insights include an analysis of neuron weights, neuron learning features, neuron histories, neuron lineages, correlated neurons and unused neurons.

* * * * *